UNITED STATES PATENT OFFICE.

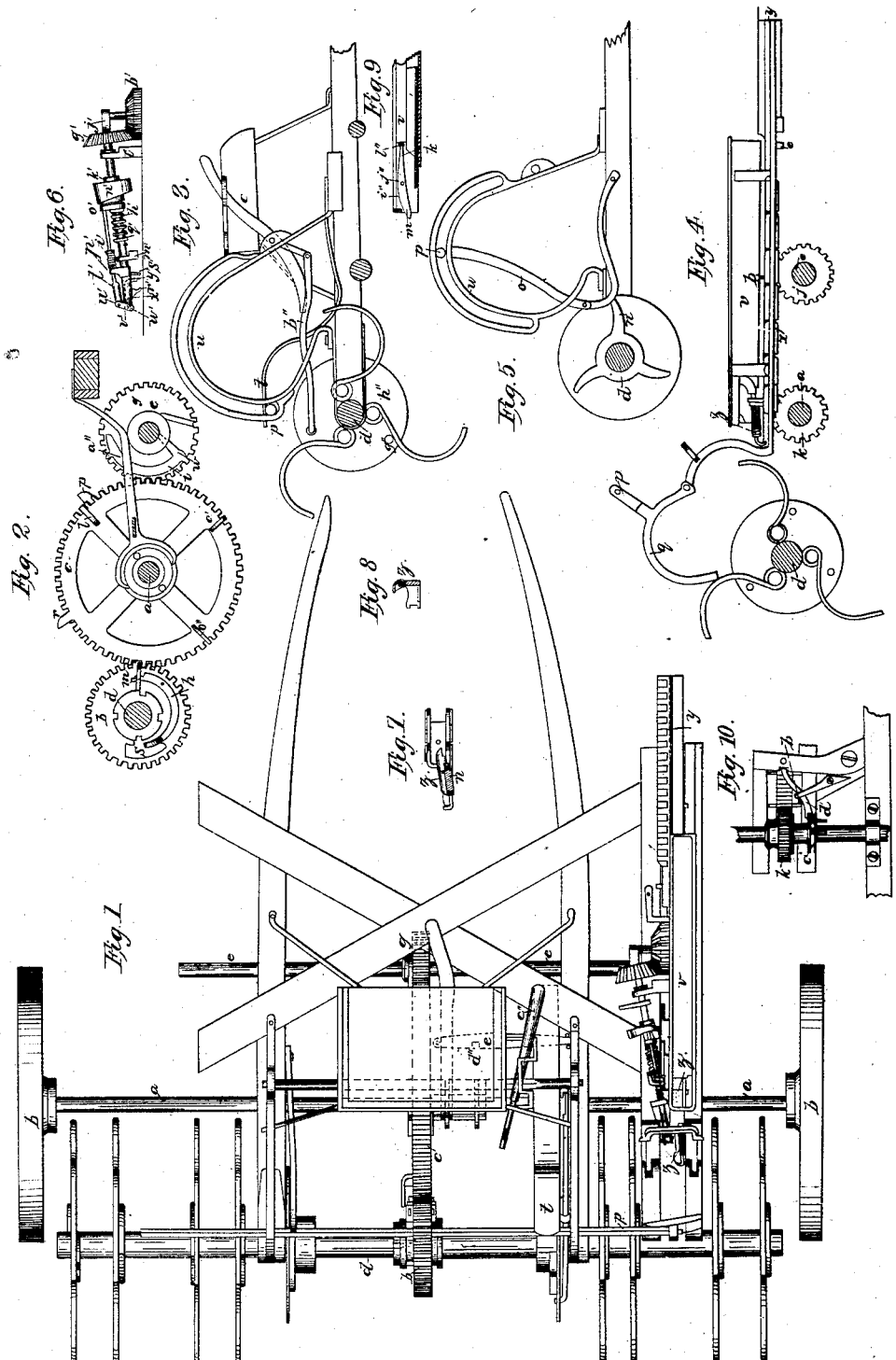
A. S. HARDING.
MACHINE FOR RAKING AND BINDING GRAIN.
No. 34,999. Patented Apr. 15, 1862.

ABNER S. HARDING, OF MOUNT HOPE, NEW YORK, ASSIGNOR TO HIMSELF AND A. S. DODGE.

IMPROVEMENT IN MACHINES FOR RAKING AND BINDING GRAIN.

Specification forming part of Letters Patent No. 34,999, dated April 15, 1862.

*To all whom it may concern:*

Be it known that I, ABNER S. HARDING, of Mount Hope, in the county of Orange and State of New York, have invented certain new and useful Improvements on Machines for Raking and Binding Grain; and I do hereby declare the following to be a full, clear, and exact description thereof, reference being had to the accompanying drawings, and to the letters and marks thereon.

My improvements are designed, when in use as a machine, to gather up from the swath of grain the proper quantity to form a sheaf, and to bind such quantity into a sheaf, using straw or its equivalent for the band; the entire operation of gathering up the cut grain and forming it into a complete sheaf being performed by the machine. My improvements may be used in the field as a distinct machine, or they may be attached to any reaping-machine. When so attached, the grain will be taken from the bed or platform of the reaper, upon which the rake of the reaper has delivered it.

By the drawings, forming part of this specification, my improvements are shown embodied in a machine for gathering up the grain from the swath, Figure 1 of these drawings being a top view of the machine; Fig. 2 being a side view of the toothed wheels which constitute the gearing of the shafts; Fig. 3 being a side view of a section of the machine, and showing a part of the devices or means for operating the rake; Fig. 4 being a side view of a portion of the devices used for clamping the sheaf, and for forming the band, and for binding; Fig. 5 being a side view of cams upon the shaft of the rake, and a curved lever which operates the bar of the clamper; Fig. 6 being a side view of the devices for securing the ends of the band; Fig. 7 being a side view of the grapple which raises the straw for the band; Fig. 8 being a view by transverse section of the grapple; and Fig. 9 being a side view of the plate or blade which opens the grapple, with a view of the box.

The parts shown in all the figures, except the first, are shown as detached from the machine; and in all the figures where like parts are shown like marks and letters are used to indicate the parts.

When these improvements are used in connection with a reaper, suitable means will be used to make the connection and to communicate the power to work the parts.

When used as a distinct machine, the binding of the sheaves can be performed on both sides of the machine. The drawings of this application show the means for binding on the one side only, but, as is evident, the like means can be placed on the other side of the machine also.

When used as a distinct machine, the axle $a$ of the running or traveling wheels $b$ is the source of motive-power. The rotation of this axle, through the toothed wheel $c$ on it, gives motion to the shafts $d$ and $e$, through the intervention of the toothed wheels $f$ and $g$. Shaft $d$ is the rake's shaft, and shaft $e$ the shaft that operates the devices for binding. The wheel $c$ is fixed rigidly to its shaft, but the wheels $f$ and $g$ are not so fixed to their respective shafts. Pawls within each wheel, marked $h$ and $i$, are so operated as to make and break the connection between the wheels $f$ and $g$ and their shafts as to rotate the shafts only when the rotation is required. These pawls are balanced pawls, and they are moved by studs or projections upon or affixed to the wheel $c$. These studs or projections on wheel $c$, as shown by the drawings, are so arranged as to produce motion of the rake's shaft at every six-and-a-half feet travel of the machine, that distance being usually the one that the swath is regarded as having the proper quantity of cut grain for the sheaf; but, as is evident, the projections or studs may be so arranged as to move the shafts sooner or later, and the pawls may be made adjustable on wheel $c$, so that the change for taking up the grain for the sheaf may be made at any moment. The studs on wheel $c$, for operating the pawl of wheel $g$ on shaft $e$, are so arranged as to rotate shaft $e$ and give motion to the binding devices, in accordance with the movements of the rake's shaft, as the one must be in unison with the other, the time for passing the band around the grain in the clamper being due to the raising up of the grain by the rake and the placing of the quantity required in the clamper for forming the sheaf. The motion of the devices for passing the band around the grain in the clamper is derived from the shaft $e$, through its toothed wheel $j$, and the motion for the return of these devices is obtained from the axle $a$, through a wheel, $k$, which runs loose upon the axle at all times except during this return of the band devices, when it is put in connection with the shaft by a sliding clutch, and thus made to rotate with it. This clutch, $c'$, with the operative devices connected with it, is shown by Fig. 10.

A part of the clamper is rigid and a part movable. The movable part is operated by power derived from the rake's shaft $d$.

The devices for making the knot of the band are operated by the toothed bar and chain $y\ x$, having their motions by the toothed wheels $j$ and $k$.

When this machine is by the side and partly over the swath, the parts will be in the condition represented by Fig. 1. The machine having been moved six and a half feet, the axle $a$ and the gearing-wheels being the only pieces that have been put in motion, and the teeth of the rake next to the ground having drawn along the grain of the swath for the six and a half feet, the further motion of the axle brings the stud $l$, on the wheel $c$, in contact with the end $m$ of the pawl $h$, and puts the wheel $f$ in connection with the shaft $d$ of the rake, by which the shaft is put in motion, and the teeth of the rake having the grain are moved upward, presenting the grain to the clamp, the clamp having been brought to the position shown by Fig. 4 by these means, viz: The rotation of the rake's shaft $d$ has, by a cam, $n$, as is shown by Fig. 5, elevated the curved and jointed lever $o$, the upper end of which is connected to rod $p$, and the end of rod $p$ being affixed to the movable part $g$ of the clamp, the clamp has been brought to the proper position for receiving the grain. Having carried up the grain and presented it to the clamp, the rake comes to a rest, the connection between its shaft and the wheel $f$ being broken by the stud $r$ of wheel $c$ coming in contact with the other end, $s$, of the pawl $h$, and releasing the shaft from the pawl. At the same time that the shaft $d$ becomes released from the pawl the movable part of the clamp $q$ is forced down upon the grain by the spring $t$. This condition of the clamp is indicated by the position of the rod $p$ in Fig. 3, which figure also shows the guide-bar $u$ of the rod $p$. The grain being within the clamp, the devices for making the band and binding it are put in motion. The straw out of which the band is made is put into the box $v$ before starting the machine. This box can be the size necessary for a sheaf of straw, or for any other quantity deemed convenient. The rotation of the wheel $c$ brings the stud $l$ in contact with the end $w$ of pawl $i$ of the wheel $g$, and thus makes the connection with shaft $e$. This shaft $e$, by its wheel $j$, then moves toward the clamp the chain-bed $x$ and the toothed bar $y$. On the end of the chain-bed next to the clamp is the grapple $z$, which has seized a sufficient quantity of straw from the box $v$, through a hole, $z$, therein, to form the band. As this act of the grapple $z$ occurs on the return movement of the chain-bed and toothed bar, the manner in which it is performed will be described hereafter. The grapple $z$, holding firm one end of the straw for the band, is, with the chain-bed and toothed bar, moved onward, the teeth of wheel $j$ fitting into teeth on the under surface of the chain and bar, and the grapple and the chain being guided by the clamp, are passed around the grain, the straw for the band thus encircling the grain. The grapple in its circling movement having reached the end of its movement, meets the hooks which operate upon the other end of the straw for the band and twist both ends and form the knot. These hooks or teeth, with their rods, are best shown by Fig. 6. The hook $y'$ is slightly cleft at its point. It is pivoted near its center, $x'$, to the rod $q'$, and is again pivoted at its base $w'$ to a link, $v'$, the link being pivoted, $w'$, to the rod $t'$. Hooks or teeth $s'$ and $r'$ are rigidly attached to the rod $q'$. The rod $t'$ passes loosely through a guiding-collar, $p'$, which is rigid on the rod $q'$. Rod $t'$ passes, also, loosely through another collar, $o'$, likewise rigidly connected to rod $q'$, and its end here bears against a cam, $n'$, which has motion upon rod $q'$. Rod $q'$ is supported by the standard $l'$, in which it rotates, and also by standard or bar $k'$, both of which are affixed to a plate rigidly attached to the frame of the machine. Rod $q'$ has an end-bearing at $j'$. A bar, $m'$, rigidly attached to rod $t'$, is curved toward and surrounds rod $q'$, and plays upon it. This bar $m'$ serves in compressing the springs $i'$ and $h'$. The rods $t'$ and $q'$ are put in motion by the beveled tooth-wheels $g'$ and $f'$, the toothed periphery of wheel $g'$ being acted upon by the teeth of the bar $y$. The motion of these wheels and rods takes place just before the grapple $z$ reaches the end of its movement. The rear end of the straw for the band is first seized by the hook $s'$, the rod $q'$ being in rotation, the straw also lying within the cleft of the hook $y'$. The two rods $t'$ and $q'$ being in motion, rod $t'$ is forced forward by the action of the cam $n'$ on the rod, and the hook $y'$ is thus thrown back, and while thus back the beak of the grapple $z$ is passed down between the hooks $r'$ and $s'$. The continued motion of the rods now brings the thin part of the cam $n'$ to the end of rod $t'$, allowing spring $i'$ to expand, pressing rod $t'$ back and throwing out the hook $y$, which seizes both ends of the band and opens the grapple $z$. These motions occur in a few moments, and following them quickly comes the return motion of the chain and bar. This return is caused by the teeth of the wheel $k$ acting upon the teeth of the chain and bar on the under side. The wheel $k$ is thrown into gear near the termination of the forward movement of the chain and bar by the stud $e'$ on the under side of the bar moving the lever $d'$. Fig. 4 shows this stud, while the devices for gearing and ungearing wheel $k$ are fully shown by Fig. 10. In this figure $d'$ is the lever, $c'$ the clutch, $b'$ the pin on the bar for ungearing on the return motion of the chain and bar. As wheel $k$ is thrown into gear, wheel $j$ is thrown out of gear. Wheel $j$ is thrown out of gear by the stud $a'$ on wheel $c$ hitting the stud $a''$ on the end of the pawl $i$.

The return movement of the bar and chain reverses the motion of rotation of the beveled wheels $f'$ and $j$ and the rods $t'$ and $q'$. This reversed rotation through the hooks heretofore named twists the ends of the band, and as the return motion continues the twist is turned under the band by the stud $b''$ on the chain acting against bar $m'$, by which action the rod $t'$ is forced back, thrusting out the hook $y$ to its full extent, which thrust forces the twist under the band, and completes the knot.

The lever $c''$, through an ordinary clutch arrangement, throws in and out of gear the wheel $c$ on the axle $a$, the wheel $c$ being of course out of gear when the machine is being transported, or when not in use. When the lower end of the lever $c''$ is thrown out from the notch $d''$ in plate $e''$, the lever may be used to hold the rake's shaft firm and carry any grain that may rest on the upper teeth, by thrusting forward the side-rod $f''$, which is jointed to the lever-shaft, the end of this side rod thereby fitting into a hole, $g''$, in the plate $h''$.

The manner in which the grapple $z$ seizes a part of the straw to form the band is thus: On the return movement of the chain and bar the grapple $z$ is brought in contact with a plate, $h'''$, pivoted, $j''$, to the side of the box $v$. One end, $k''$, of this plate fits into a hole, $l''$, in which it has a little play. The other end of the plate being the heaviest, by its weight has the position proper for the grapple $z$ to ride upon it. The grapple, therefore, as it is carried along, comes upon this end $m''$ of the plate, and is forced open, as is shown by Fig. 8, it being connected to a link of the chain by a hinge. As it passes onward, the grapple moves off from the plate, and is forced down upon the straw by a spring, $n''$, thus clamping the straw for forming the band.

The stud $o''$ on wheel $c''$ operates for the second six and a half feet, in the place of the stud $l$, and the stud or projection $p''$ for the stud $r$. On the third six and a half the studs $l$ and $r$ again come into play, and this change of the studs continues on with the continued operation of the machine.

What I claim as my invention, and desire to secure by Letters Patent, is—

1. The rotating rake for gathering up and presenting the grain to the clamp, in combination with the clamp, when they are constructed and operated substantially as described.

2. The combination of means herein recited, or their equivalents, for raising the straw to form the band from the box and passing it around the grain in the clamp.

3. The combination of means, or their equivalents, for forming the band and securing it around the grain in the clamp and completing the sheaf, substantially as set forth.

4. The arrangement of the lever $c''$, the side rod $f''$, and the plate $h''$, having the hole $g''$ for holding the rake's shaft, as and for the purpose described.

This specification signed this 8th day of February, 1862.

A. S. HARDING.

Witnesses:
 THOS. T. EVERETT,
 A. S. DODGE.